United States Patent
Kato et al.

(10) Patent No.: US 9,432,552 B2
(45) Date of Patent: Aug. 30, 2016

(54) IMAGE SCANNING APPARATUS

(71) Applicant: BROTHER KOGYO KABUSHIKI KAISHA, Nagoya, Aichi (JP)

(72) Inventors: Tetsuya Kato, Nagakute (JP); Taiki Yamano, Aichi (JP); Takashi Matsumi, Aichi (JP); Shuichi Sunako, Ama (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/932,149

(22) Filed: Nov. 4, 2015

(65) Prior Publication Data
US 2016/0134781 A1 May 12, 2016

(30) Foreign Application Priority Data

Nov. 10, 2014 (JP) ................................. 2014-227756
Jul. 14, 2015 (JP) ................................. 2015-140222

(51) Int. Cl.
*H04N 1/407* (2006.01)
*H04N 1/60* (2006.01)

(52) U.S. Cl.
CPC ............ *H04N 1/407* (2013.01); *H04N 1/6027* (2013.01); *H04N 2201/0094* (2013.01)

(58) Field of Classification Search
CPC ............... H04N 1/407; H04N 1/6027; H04N 2201/0094
USPC ........................................ 358/521, 518, 516
See application file for complete search history.

(56) References Cited

U.S. PATENT DOCUMENTS

| 4,807,045 A | 2/1989 | Shimano |
| 7,324,236 B2 | 1/2008 | Ohashi |
| 2003/0038983 A1* | 2/2003 | Tanabe .................. H04N 1/401 358/461 |
| 2004/0105135 A1 | 6/2004 | Sawada |
| 2015/0281503 A1 | 10/2015 | Hori et al. |
| 2015/0281504 A1 | 10/2015 | Hori et al. |

FOREIGN PATENT DOCUMENTS

| JP | 2000-125094 A | 4/2000 |
| JP | 2003-298813 A | 10/2003 |
| JP | 2012-204849 A | 10/2012 |

OTHER PUBLICATIONS

U.S. Office Action dated Sep. 25, 2015 issued in U.S. Appl. No. 14/672,351.

(Continued)

*Primary Examiner* — Jamares Q Washington
(74) *Attorney, Agent, or Firm* — Scully, Scott, Murphy & Presser, PC

(57) ABSTRACT

An image scanning apparatus, comprising: a gray reference member; a scanning unit; a signal conversion unit; a controller configured to: calculate white and black difference data of one line by subtracting first black data of one line from white data of one line; calculate a white and black difference maximum value and obtain a particular pixel position corresponding to the white and black difference maximum value; calculate light gray black difference data of one line by subtracting second black data of one line from light gray data of one line; calculate a gray white ratio by dividing the white and black difference maximum value at the particular pixel position by the light gray black difference data at the particular pixel position; and calculate reference data of one line by multiplying light gray data of one line by the gray white ratio.

6 Claims, 7 Drawing Sheets

(56) References Cited

OTHER PUBLICATIONS

Notice of Allowance dated Jan. 29, 2016 from related application U.S. Appl. No. 14/672,351.

* cited by examiner

IMAGE SCANNING APPARATUS

CROSS-REFERENCE TO RELATED APPLICATION

This application claims priority under 35 U.S.C. §119 from Japanese Patent Applications No. 2014-227756, filed on Nov. 10, 2014 and No. 2015-140222, filed on Jul. 14, 2015. The entire subject matter of the applications is incorporated herein by reference.

BACKGROUND

1. Technical Field

The present disclosures relate to an image scanning apparatus.

2. Related Art

Generally, an image scanning apparatus employs a white reference member as a light distribution reference member to be used for a shading correction. When scanning is executed, an image of an original sheet passing over the white reference member is scanned. When the white reference member is used, however, there may occur a show-through phenomenon which is a phenomenon that a change in thickness of color on a back surface of the original sheet affects scanning of an image formed on a front surface of the original sheet. In order to reduce such a show-through phenomenon, image scanning apparatuses employing the gray reference member, which has a smaller reflection coefficient than the white reference member, have been suggested recently.

An example of such an image scanning apparatus employs a non-white reference member which is provided as a guide for the original sheet in a sheet conveying device. In such an image scanning apparatus, the shading correction is performed, based on the reflection coefficient of the non-white reference member, so that a reflection density obtained by scanning the non-white reference member has substantially the same quantity as a reflection density obtained by scanning the white reference member. When an image on the original sheet, which is conveyed by the conveying device, is scanned, the shading correction is applied based on the reflection density compensated as above.

SUMMARY

In the above described example of the image scanning apparatus, the reflection density of the non-white reference member is corrected based on the reflection coefficient of the non-white reference member stored in a ROM of the image scanning apparatus so that the reflection density of the non-white reference member becomes equal to the reflection density of the white color. That is, the reflection density is connected by multiplying the reflection coefficient of the non-white reference member with respect to the reflection coefficient of 100% of the white color by the reflection density of non-white reference member. Thus, the correction is executed by a fixed value store in advance in the ROM, i.e., the reflection coefficient (%) of the non-white reference member with respect to the reflection coefficient of 100% of the white color.

However, since the non-white reference member is manufactured, for example, by printing, fluctuation of density of non-white reference member occurs even if the reference density of the non-white reference member is controlled. Furthermore, the reflection density of the white color obtained by scanning the white reference member fluctuates due to fluctuation of the output density of a scanning device. Due to effects of these types of fluctuations, the reflection coefficient of the non-white reference member or the reflection density of the white color fluctuates. Therefore, due to the fluctuations of the reflection coefficient of the non-white reference member or the reflection density of the white color, when the correction is executed using the above described fixed value, it becomes impossible to execute accurately the shading correction. As a result, fluctuation of density, i.e., fluctuation of gradation, occurs.

In consideration of the above, aspects of the disclosures provide an image scanning apparatus capable of suppressing the fluctuation of tone gradation of the image which is scanned with use of the gray reference member.

According to an aspect of the disclosures, there is provided an image scanning apparatus, comprising: a gray reference member disposed in a conveying path in which an original sheet is to be conveyed, a reflection coefficient of the gray reference member being lower than that of a white reference member; a scanning unit configured to scan an image on the original sheet on a line basis, the scanning unit including a light source configured to illuminate the original sheet when the original sheet passes the gray reference member and a photoelectric conversion element aligned in a scanning direction which is a transverse direction of the conveying path; a light quantity setting unit configured to set a light quantity adjustment value for the light source within a range up to a particular maximum light quantity value; a signal conversion unit configured to convert an analog signal outputted from the photoelectric conversion element to digital data; a correction unit configured to execute shading correction for the digital data based on reference data; a storage unit; and a controller configured to execute a preparatory operation and thereafter execute a scan-preprocessing operation. In this configuration, as the preparatory operation, the controller is configured to: obtain first black data of one line output from the signal conversion unit in a state where the light source is turned off; obtain white data of one line output from the signal conversion unit when the light source illuminates the white reference member in a state where the light quantity adjustment value is a particular light quantity adjustment value; calculate white and black difference data of one line by subtracting the first black data of one line from the white data of one line at same pixel positions; calculate a white and black difference maximum value which is a maximum value from all pixels of the one line of the white and black difference data and obtain a particular pixel position corresponding to the white and black difference maximum value; and store the white and black difference maximum value and the particular pixel position in the storage unit while associating the white and black difference maximum value with the particular pixel position. As the scan-preprocessing operation, the controller is configured to: obtain second black data of one line output from the signal conversion unit in a state where the light source is turned off; obtain light gray data of one line output from the signal conversion unit when the light source illuminates the gray reference member at the particular maximum light quantity value; calculate light gray black difference data of one line by subtracting the second black data of one line from the light gray data of one line; calculate a gray white ratio by dividing the white and black difference maximum value at the particular pixel position by the light gray black difference data at the particular pixel position;

and calculate the reference data of one line by multiplying the light gray data of one line by the gray white ratio.

BRIEF DESCRIPTION OF THE ACCOMPANYING DRAWINGS

FIG. 1 is a cross-sectional side view schematically showing main components of an image scanning apparatus according to an illustrative embodiment of the disclosures.

FIG. 2 schematically shows a scanning unit of the image scanning apparatus according to the illustrative embodiment of the disclosures.

FIG. 3 schematically shows a configuration of a light receiving unit of the scanning unit according to the illustrative embodiment of the disclosures.

DETAILED DESCRIPTION

Hereinafter, referring to the accompanying drawings, an image scanning apparatus 1 according to an illustrative embodiment of the disclosures will be described. In the following description, when directions are indicated, directions depicted in FIG. 1 will be referred to.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

Figure 1:
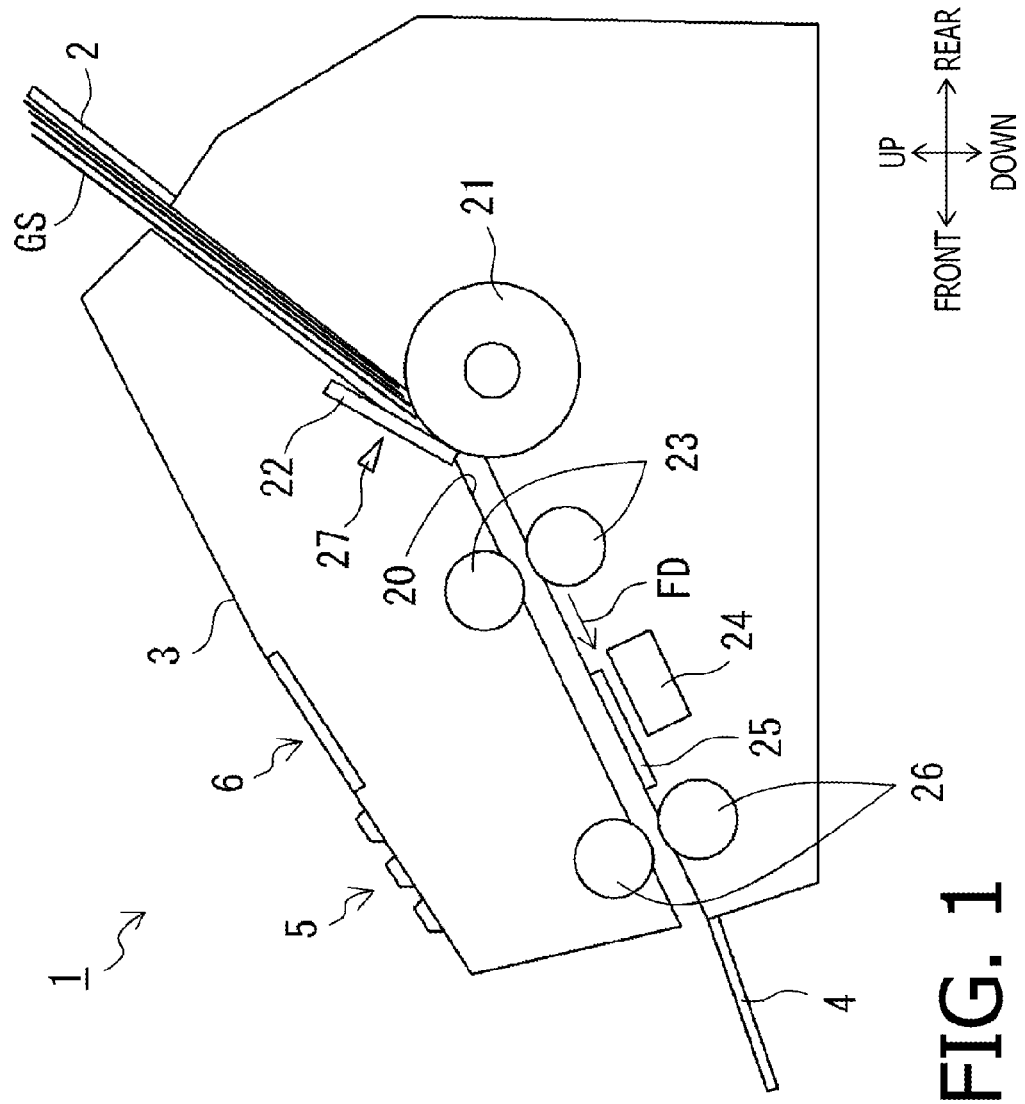

As shown in FIG. 1, the image scanning apparatus 1 has a sheet feeding tray 2, a main body 3, a discharged sheet tray 4. Further, an operation unit 5, a display unit 6 are arranged on an upper surface of the main body 3. The operation unit 5 includes a power switch, and various setting buttons, and is configured to acquire operational instructions by a user. For example, the operation unit 5 may include a selection button to select a color mode using three colors or a monochrome mode using a single color, a resolution setting operation button, and the like. The display unit 6 includes an LCD (liquid crystal display) and displays an operational status of the image scanning apparatus 1.

A conveying path 20 is defined inside the main body 3. The original sheets GS placed on the sheet feeding tray 2 are conveyed in a conveying direction FD, along the conveying path 20, and are discharged on the discharged sheet tray 4. A feeding roller 21, a separation pad 22, a pair of upstream conveying rollers 23, a scanning unit 24, a platen glass 25 and a pair of downstream conveying rollers 26 are arranged along the conveying path 20 as shown in FIG. 1.

The feeding roller 21, in association with the separation pad 22, feeds the plurality of original sheets GS placed on the sheet feeding tray 2 one by one. The upstream conveying rollers 23 and the downstream conveying rollers 26 are driven by a conveying motor MT (see FIG. 4). The platen glass 25 is a transparent member and arranged along and below the conveying path 20. The conveying rollers 23 and 26 convey the original sheet GS fed from the feeding roller 21 to pass over the platen glass 25.

According to the illustrative embodiment, the original sheets GS are placed on the sheet feeding tray 2 such that a scan surface (i.e., a surface subject to scan) of each original sheet GS faces the placement surface of the sheet feeding tray 2. The scanning unit 24 is arranged below the conveying path 20, and scans an image on the scan surface of the original sheet GS as it passes over the platen glass 25. An original sheet sensor 27 is arranged on the sheet feeding tray 2, which sensor 27 is turned ON when one or more original sheets GS are placed on the sheet feeding tray 2, while the sensor 27 is turned OFF when there is no sheet GS on the sheet feeding tray 2.

Figure 2:
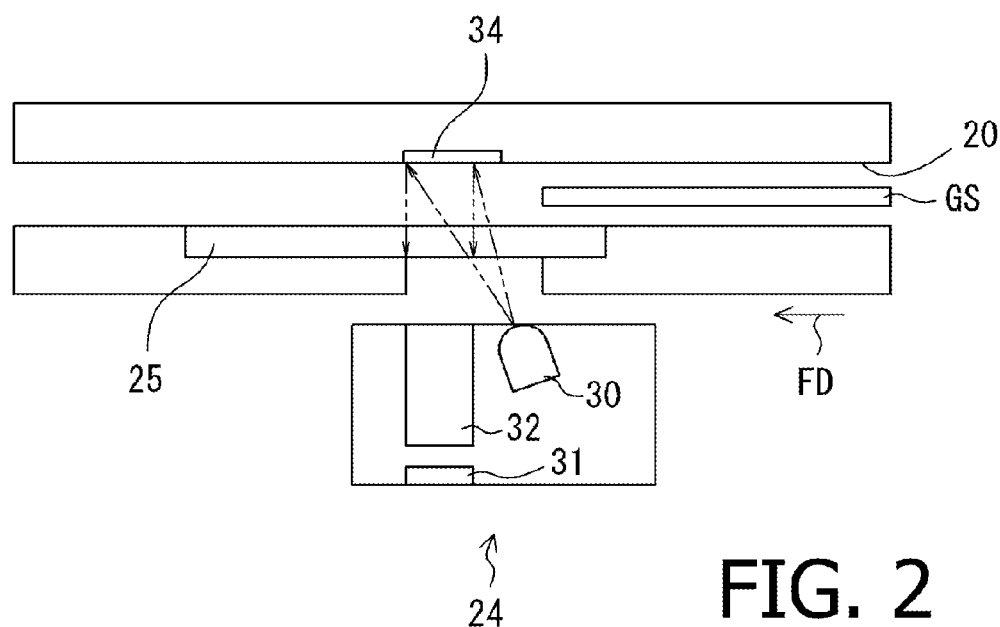

In FIG. 2, the scanning unit 24 has a light source 30, a light receiving unit 31, and an optical element 32. The light source 30 includes red, green and blue LEDs (light emitting diodes) emitting red, green and blue light, respectively. The light emitted from the light source 30 is reflected by the scan surface of the original sheet GS at a portion above the platen glass 25. Then, the reflected light is directed to the light receiving unit 31 through the optical element 32. When the color mode is selected, one line of the image on the original sheet GS is scanned by sequentially turning on the red, green and blue LEDs. When the monochrome mode is selected, a specific one of the three-color LEDs (e.g., the red LED) is turned on to obtain one line of image on the original sheet GS. Red LEDs are inexpensive and are able to output high luminance light.

A gray reference plate 34 is arranged at a position opposite to the scanning unit 24 with respect to the conveying path 20 and facing the scanning unit 24. The gray reference plate 34 has a lower reflection coefficient than a background color (i.e., white) of the original sheet GS. When there is not an original sheet GS in the conveying path 20, the light emitted by the light source 30 is reflected by the gray reference plate 34, and the reflected light is received, through the optical element 32, by the light receiving unit 31. According to the illustrative embodiment, the optical element 32 includes a rod lens extending in a direction of a main scanning direction MD (see FIG. 3).

Figure 3:
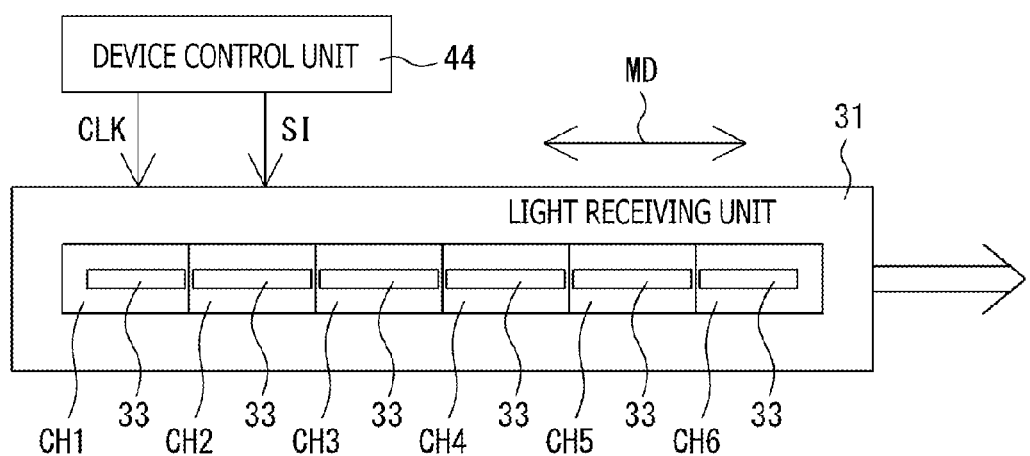

In FIG. 3, the light receiving unit 31 has a plurality of sensor IC (integrated circuit) chips linearly arranged in the main scanning direction MD. Each IC chip includes a plurality of photoelectric conversion elements 33 aligned in the main scanning direction MD, and further includes a shift register and a built-in amplifier. The plurality of sensor IC chips are divided into six channels CH1-CH6. Each channel includes one or two sensor IC chips. Since a configuration of such a sensor IC chip (i.e., one having a plurality of IC chips) is well-known, detailed description thereof will be omitted for brevity.

Figure 4:
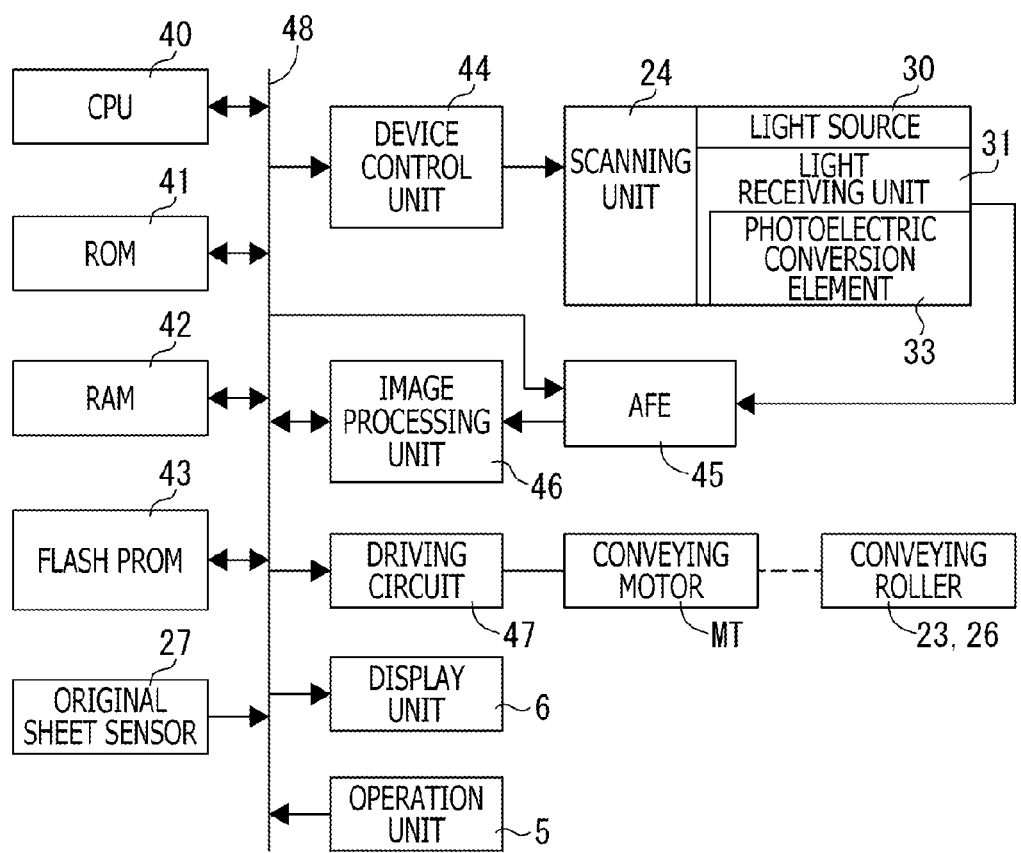
FIG. 4 is a block diagram showing an electrical configuration of the image scanning apparatus according to the illustrative embodiment of the disclosures.

As shown in FIG. 4, the image scanning apparatus 1 includes a CPU (central processing unit) 40, a ROM (read only memory) 41, a RAM (random access memory) 42, a flash PROM (a flash programmable ROM) 43, a device control unit 44, an analog front end IC (hereinafter, abbreviated as AFE) 45, an image processing unit 46 and a driving circuit 47. These components are connected to the operation unit 5, the display unit 6 and the original sheet sensor 27 through a bus 48.

The ROM 41 stores programs causing the image scanning apparatus 1 to execute a maintenance main process, a scanning main process, and sub processes called in the main processes. The CPU 40 controls respective components/units in accordance with the programs retrieved from the ROM 41. The flash PROM 43 is a rewritable non-volatile memory and stores various pieces of data which are generated during processing of the CPU 40 (e.g., data calculated in the maintenance main process). The RAM 42 temporarily stores calculation results and the like generated during the controlling processes executed by the CPU 40.

The device control unit 44 is connected to the scanning unit 24, and transmits signals to control power on/off of the light source 30 and a signal to control a value of an electrical current flowing through the light source 30 to the scanning unit 24 under control of the CPU 40. Further, the device control unit 44 transmits a clock signal CLK for transferring each pixel data and a serial-in signal SI for simultaneously transferring electric signals of all the photoelectric conversion elements 33 to the shift register, to the light receiving unit 31 (see FIG. 3) in order to sequentially drive the plurality of photoelectric conversion elements 33 of each of the IC chips of the light receiving unit 31 in accordance with instructions from the CPU 40. When the scanning unit 24 receives the illumination control signal from the device control unit 44, the scanning unit 24 powers on the light source 30 and transmits the analog signal corresponding to the light quantity of the light the light receiving unit 31 has received to the AFE 45. The maximum light quantity emitted by the light source 30 is a light quantity determined by a predetermined maximum current and a time period for which the light source is able to illuminate within an interval of the serial-in signals SI.

The AFE 45 is connected to the scanning unit 24, and converts the analog signal transmitted from the scanning unit 24 to a digital signal in accordance with instructions from the CPU 40. The AFE 45 has a predetermined input range and resolution power. For example, when the resolution power is 10 bits, 1024 gradation steps (i.e., 0-1023) can be achieved. In such a case, the AFE 45 is capable of converting the analog signal transmitted from the scanning unit 24 into 10-bit digital signal (i.e., gradation data) represented in 1024 gradation steps. The digital data converted by the AFE 45 is transmitted to the image processing unit 46. The image processing unit 46 includes an ASIC (application-specific integrated circuit) particularly designed for an image processing, and applies various image processing operations to the digital data. The image processing operations may include a shading correction, various types of other corrections (e.g., γ correction), a resolution conversion process and the like. The image processing unit 46 may be set not to execute the various image processing operations, and may be set to execute the various image processing operations. The image processing unit 46 applies such image processing operations to the digital data, and generates digital image data. The thus generated digital image data is transmitted through the bus 48 to the RAM 42 and stored therein.

The driving circuit 47 is connected to the conveying motor MT, and drives the conveying motor MT in accordance with driving instructions transmitted from the CPU 40. The driving circuit 47 rotates the conveying motor MT in accordance with a rotation amount and a rotation direction instructed by the driving instructions. When the conveying motor MT rotates by a predetermined amount, the conveying rollers 23 and 26 rotate by predetermined angles, thereby the original sheet GS being conveyed along the conveying path 20 by a predetermined distance.

Hereafter, operation of the image scanning apparatus 1 will be described. The image scanning apparatus 1 mainly executes the maintenance main process which is executed before the original sheet GS is scanned, and the scanning main process which is executed to scan the original sheet GS. Steps M1 to M15 in the maintenance main process, steps R1 to R8 in the scanning main process and steps in each subroutine are executed by the CPU 40. In this illustrative embodiment, data processing executed by the CPU 40 for each of pixels in one line corresponds to a process executed for each of pixels of three colors in the color mode, and corresponds to a process executed for each pixel of a particular one color in the monochrome mode.

Figure 5:
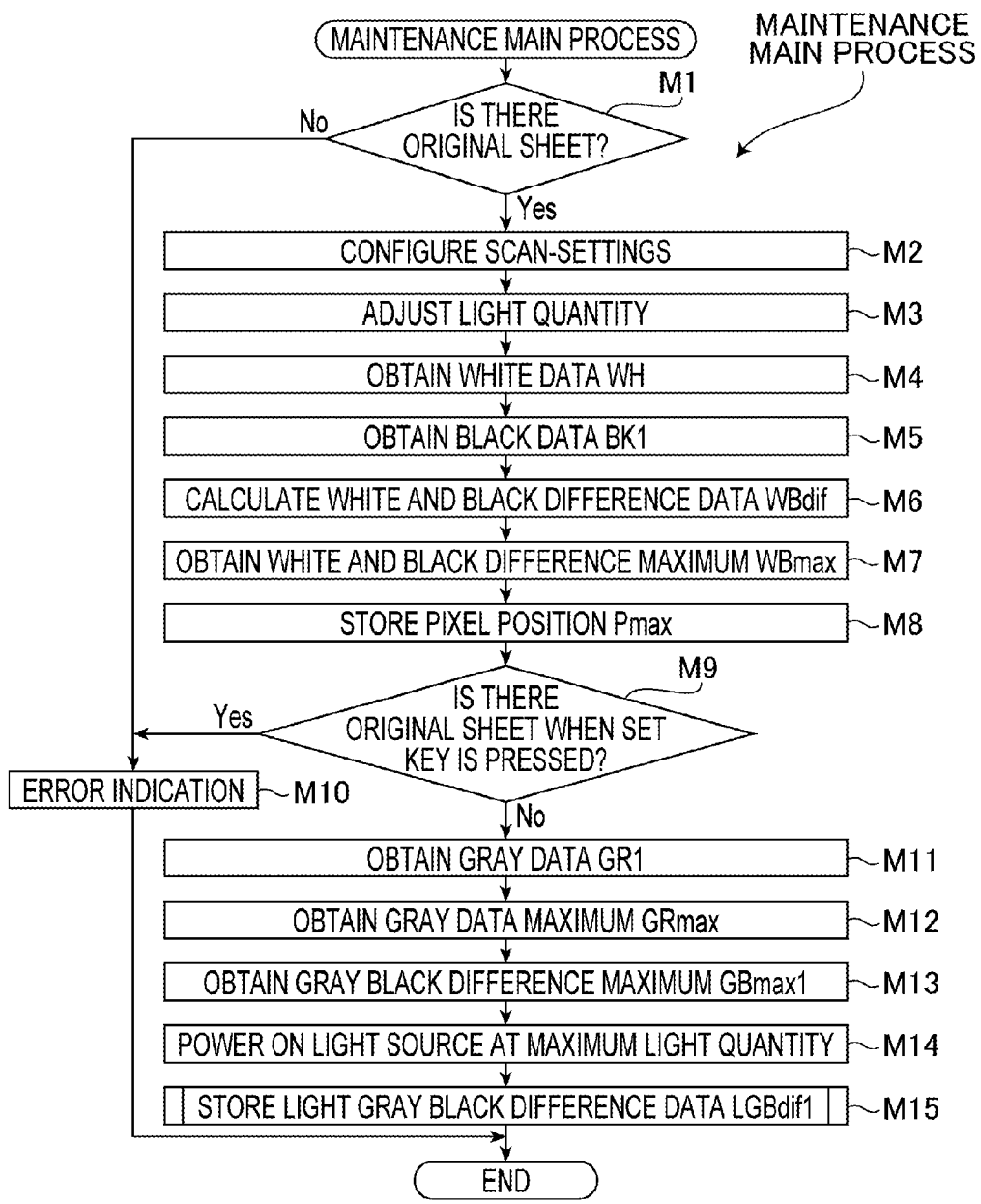
FIG. 5 is a flowchart illustrating a maintenance main process according to the illustrative embodiment of the disclosures.

The maintenance main process shown in FIG. 5 is started, when a worker, such as a service person, operates the operation unit 5 of the image scanning apparatus 1 according to a particular operating manner before the image scanning apparatus 1 is shipped or when the service person conducts maintenance and checkup after shipment.

First, when the service person places a particular original sheet GS, which is a white reference, on the sheet feeding tray 2, the original sheet sensor 27 detects the original sheet GS. In accordance with a detection signal from the original sheet sensor 27, the CPU 40 determines whether or not the original sheet GS exists (M1). When the original sheet GS exists (M1: YES), the process proceeds to step M2. When the original sheet GS does not exists (M1: NO), the process proceeds to step M10 where an error message indicating absence of the original sheet GS is displayed on the display unit 6 (M10). Then, the maintenance main process is terminated.

The CPU 40 feeds the original sheet GS to the platen glass 25 by controlling the driving circuit 47, and sets scan-settings to the device control unit 44, the AFE 45 and the image processing unit 46 (M2). Specifically, the CPU 40 transmits a drive command to the driving circuit 47 to feed the white reference original sheet GS placed on the sheet feeding tray 2 to the platen glass 25. Then, the CPU 40 obtains settings for the clock signal CLK and the serial-in signal SI corresponding to scanning resolution of 600 DPI, and applies the settings to the device control unit 44. The CPU 40 obtains settings of signals to be applied to the light source 30 in the color mode from the flash PROM 43, and sets the settings to the device control unit 44. The CPU 40 obtains an offset adjustment value and a gain adjustment value for the AFE 45 from the flash PROM 43, and applies the settings to the AFE 45. Here, the offset adjustment value is a value for shifting a level of an analog signal input to the AFE 45, and the gain adjustment value is a value for adjusting the gain of the analog signal inputted to the AFE 45. The CPU 40 sets the image processing unit 46 not to execute the various types of image processing.

The CPU 40 adjusts a light quantity of the light source 30 (M3). Specifically, the CPU 40 causes the light source 30 to emit light toward the white reference original sheet GS, and adjusts the light quantity ST of each color such that the analog signal obtained when the light reflected from the white reference original sheet GS is scanned becomes the maximum of the input range of the AFE 45. Here, the light quantity ST is determined by a lighting time and a current of each color in the one line of the light source 30.

The CPU 40 obtains white data WH (M4). Specifically, the CPU 40 causes the light source 30 to emit light at the light quantity ST of each color, and scans the white reference original sheet GS. Then, the CPU 40 obtains, as the white data WH, digital image data of each color corresponding to the scanned one line.

The CPU 40 obtains black data BK1 (M5). Specifically, the CPU 40 turns off the light source 30 and scans the white reference original sheet GS. Then, the CPU 40 obtains, as the black data BK1, digital image data of one color in the scanned one line.

The CPU 40 calculates white and black difference data WBdif (M6). Specifically, the CPU 40 subtracts the black data BK1 from the white data WH of each color to calculate the white and black difference data WBdif of one line, and stores the calculated white and black difference data WBdif of one line in the RAM 42.

The CPU 40 obtains white and black difference maximum value WBmax (M7). Specifically, the CPU 40 obtains, as the white and black difference maximum WBmax of red color, 16 pixels of white and black difference data WBdif selected in descending order from the white and black difference data WBdif of red color of the white and black difference data WBdif of one line calculated in step M6. The CPU 40 obtains pixel positions Pmax of the 16 pixels at which the white and black difference maximum WBmax of red color are located. The CPU 40 obtains, as the white and black difference maximum WBmax of blue color, data located at the pixel positions Pmax, from one line of the white and black difference data WBdif of blue color. The CPU 40 obtains the white and black difference maximum WBmax of green color in a similar manner. Thus, the CPU 40 obtains the white and black difference maximum WBmax for each color. Regarding the magnitude of white data WH, the red color is the greatest of the blue, green and red colors. Therefore, by using the white data WH of the red color, it becomes possible to accurately calculate the gray white ratio GWRT which is described later.

The CPU 40 stores the pixel positions Pmax of the white and black difference maximum WBmax (M8). The CPU 40 stores the pixel positions Pmax at which the 16 pixels of white and black difference maximum WBmax obtained in M7 are located and the white and black difference maximum WBmax in the flash PROM 43, while associating the pixel positions Pmax with the white and black difference maximum WBmax.

After step M8 is finished, the CPU 40 keeps the image scanning apparatus 1 in a standby state until a set-key arranged on the operation unit 5 is pressed (M9). When a worker removes the white reference original sheet GS and the set-key is pressed, the CPU 40 determines whether or not the original sheet sensor 27 is OFF. When the original sheet sensor 27 is OFF (M9: NO), the process proceeds to step M11 for obtaining gray data GR1. When the CPU 40 determines that the original sheet sensor 27 is ON (M9: YES), the process proceeds to step M10 for error indication. In step M10, the CPU 40 displays, on the display unit 6, an error message indicating that the original sheet GS is mistakenly placed. Then, the maintenance main process is terminated.

The CPU 40 obtains the gray data GR1 (M11). Specifically, the CPU 40 illuminates a gray reference plate 34 at the light quantity ST for each color, and obtains, as the gray data GR1, one line of scanned digital image data.

The CPU 40 obtains gray data maximum GRmax (M12). The CPU 40 obtains, as the gray data maximum GRmax, the maximum value in one line of gray data GR1 for each color obtained in step M11. The CPU 40 stores the gray data maximum GRmax in the flash PROM 43 while associating the gray data maximum GRmax with each color.

The CPU 40 obtains gray black difference maximum GBmax1 (M13). Specifically, the CPU 40 calculates one line of gray black difference data GBdif1 by subtracting the black data BK1 from the gray data GR1 of each color. The CPU 40 obtains, as the gray black difference maximum GBmax1, gray black difference data GBdif1 located at the pixel positions Pmax of the calculated one line of gray black difference data GBdif1.

The CPU 40 powers on the light source 30 at the maximum light quantity of each color (M14). Specifically, the CPU 40 powers on the light source 30 at the maximum current preliminary defined for each color and at the maximum lighting period defined for the scanning resolution of 600 DPI.

The CPU 40 stores light gray black difference data LGBdif1 in the flash PROM 43 (M15). As described in detail later, the CPU 40 obtains light gray data LGR1 of red color by illuminating the gray reference plate 34 at the maximum light quantity of each color. The CPU 40 calculates the light gray black difference data LGBdif1 by subtracting the black data BK1 from the obtained light gray data LGR1. The CPU 40 replaces values of abnormal pixels, which have abnormal values due to, for example, dust, in the calculated light gray black difference data LGBdif1, with values of peripheral pixels. The CPU 40 stores the light gray black difference data LGBdif1 not having abnormal pixels in the flash PROM 43. After step M15 is finished, the maintenance main process is terminated.

Figure 6:
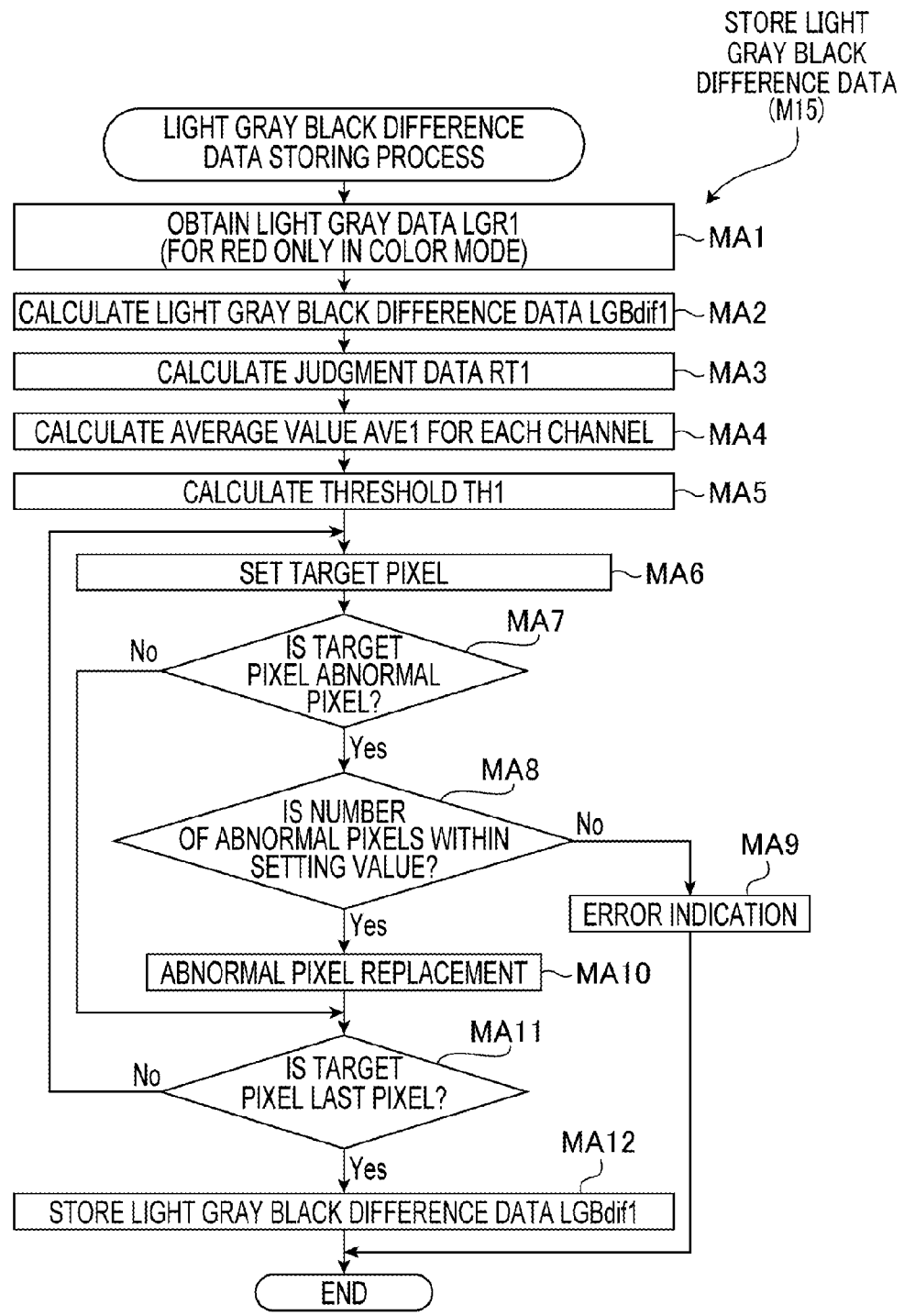
FIG. 6 is a flowchart illustrating a light gray black difference data storing process according to the illustrative embodiment of the disclosures.

When a light gray black difference data storing process shown in FIG. 6 is started, the CPU 40 obtains the light gray data LGR1 (MA1). Specifically, the CPU 40 illuminates the gray reference plate 34 in a state where the light source 30 is power-on at the maximum light quantity of each color, and obtains, as the light gray data LGR1, the digital image data of red color of the scanned one line of data.

The CPU 40 calculates the light gray black difference data LGBdif1 (MA2). Specifically, the CPU 40 calculates the light gray black difference data LGBdif1 of one color by subtracting the black data BK1 from the light gray data LGR1.

The CPU 40 calculates judgment data RT1 (MA3). Specifically, the CPU 40 calculates the judgment data RT1 for one color by dividing the light gray black difference data LGBdif1 by the white and black difference data WBdif of red color.

The CPU 40 calculates an average value AVE1 for each of the channels (MA4). Specifically, the CPU 40 divides the judgment data RT1 for one color into judgment data RT1 of respective channels. The CPU 40 calculates, as the average value AVE1 of each channel, the average value of the judgment data RT1 of the divided each channel.

The CPU 40 calculates a threshold value TH1 for each channel (MA5). Specifically, the CPU 40 calculates a white threshold value WTH1, by adding a maintenance addition value to the average value AVE1 for each channel calculated in step MA4. The CPU 40 calculates a black threshold value BTH1 by subtracting a maintenance subtraction value from the average value AVE1 for each channel calculated in step MA4. The threshold value TH1 means the white threshold value WTH1 or the black threshold value BTH1. In this illustrative embodiment, the maintenance addition value and the maintenance subtraction value are the same value which corresponds to 3% of the average value AVE1 of each channel. Since the maintenance addition value and the maintenance subtraction value are the same, the effect, given by black dust which would decrease output, to the light gray black difference data LGBdif1 and the effect, given by white dust which would increase output, to the light gray black difference data LGBdif1 can be controlled to be substantially the same level.

The CPU 40 sets a target pixel (MA6). Specifically, when the target pixel has been set, the CPU 40 sets a next pixel as the target pixel, and when no target pixel has been set, the CPU 40 sets the top pixel as the target pixel. The CPU 40 obtains the pixel number of the target pixel, and stores the pixel number in the RAM 42. The CPU 40 stores, in the RAM 42, the channel number of a target channel including the target pixel.

The CPU 40 determines whether the target pixel is an abnormal pixel (MA7). Specifically, the CPU 40 determines whether the light gray black difference data LGBdif1 of the target pixel falls within a range which is larger than or equal to the black threshold value BTH1 corresponding to the channel number of the target channel and smaller than or equal to the white threshold value WTH1 corresponding to the channel number of the target channel. When the light gray black difference data LGBdif1 of the target pixel falls within the range (MA7: NO), the CPU 40 determines that the target pixel is not an abnormal pixel and the process proceeds to step MA11 where the CPU 40 determines whether the target pixel is the last pixel. When the light gray black difference data LGBdif1 of the target pixel does not fall within the range (MA7: YES), the CPU 40 determines that the target pixel is an abnormal pixel and the process proceeds to step MA8 where the CPU 40 determines whether the number of abnormal pixels is within a set value.

The CPU 40 determines whether the number of abnormal pixels falls within the set value (MA8). Specifically, the CPU 40 adds 1 to a counter CTa representing the number of abnormal pixels in one line, and adds 1 to a counter CTb representing the number of abnormal pixels in a channel corresponding to the channel number of the target channel. The CPU 40 determines whether the counter CTa exceeds the line upper limit (e.g., 25 pixels) and determines whether the counter CTb exceeds the channel upper limit (e.g., 8 pixels). When one of the counter CTa and the counter CTb exceeds the corresponding upper limit (MA8: NO), the CPU 40 determines that the number of abnormal pixels exceeds the set value and the process proceeds to step MA9 for error indication. When none of the counter CTa and the counter CTb exceeds the corresponding upper limit (MA8: YES), the CPU 40 determines that the number of abnormal pixels falls within the set value and the process proceeds to an abnormal pixel replacement process (MA10). In the error indication process (MA9), the CPU 40 displays an error on the display unit as in the case of the error indication process M9. Then, the light gray black difference data storing process (M15) is finished.

The CPU 40 replaces the light gray black difference data LGBdif1 of the target pixel with the light gray black difference data LGBdif1 of a peripheral pixel (MA10). Specifically, the CPU 40 replaces the light gray black difference data LGBdif1 of the target pixel with the light gray black difference data LGBdif1 of a pixel included in the channel whose channel number is equal to the channel number of the target channel.

The CPU 40 determines whether the target pixel is the last pixel (MA11). Specifically, the CPU 40 determines whether the pixel number of the target pixel is equal to the pixel number indicating the last pixel. When the pixel number of the target pixel is equal to the pixel number indicating the last pixel (MA11: YES), the CPU 40 deletes the pixel number and the channel number stored in step MA6, and the process proceeds to a light gray black difference data LGBdif1 storing process (MA12). When the pixel number of the target pixel is not equal to the pixel number indicating the last pixel (MA11: NO), the process returns to the target pixel setting process (MA6).

The CPU 40 stores the light gray black difference data LGBdif1 (MA12). Specifically, the CPU 40 stores, in the flash PROM 43, the light gray black difference data LGBdif1 subjected to the replacement process in step MA10. After step MA12 is finished, the light gray black difference data storing process (MA15) is terminated.

Figure 7:
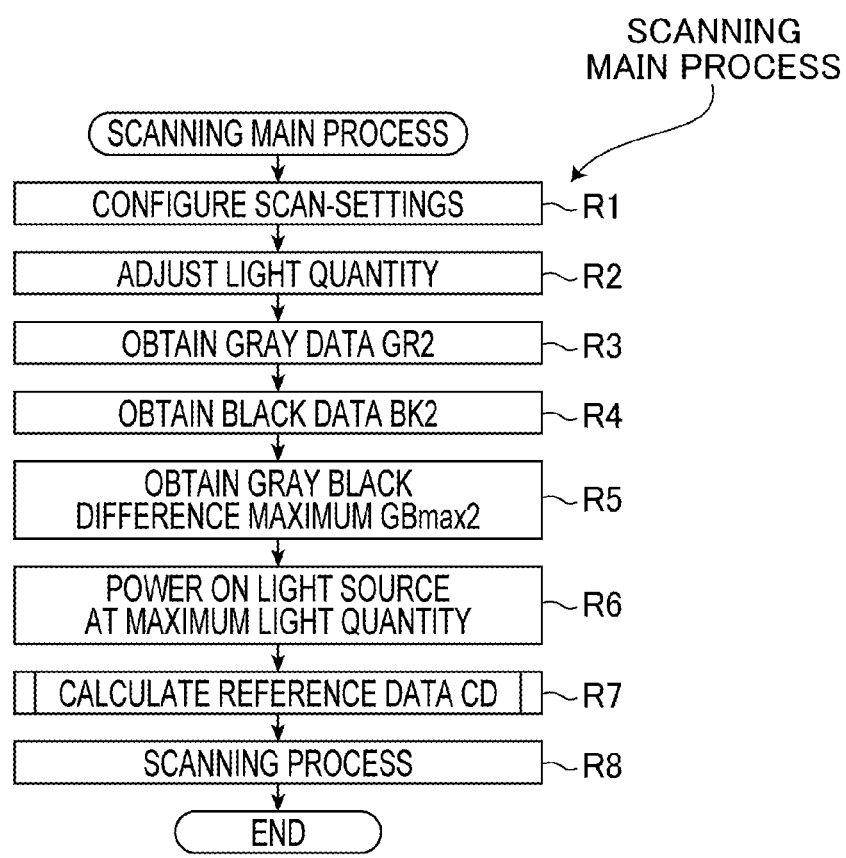
FIG. 7 is a flowchart illustrating a scanning main process according to the illustrative embodiment of the disclosures.
Figure 8:
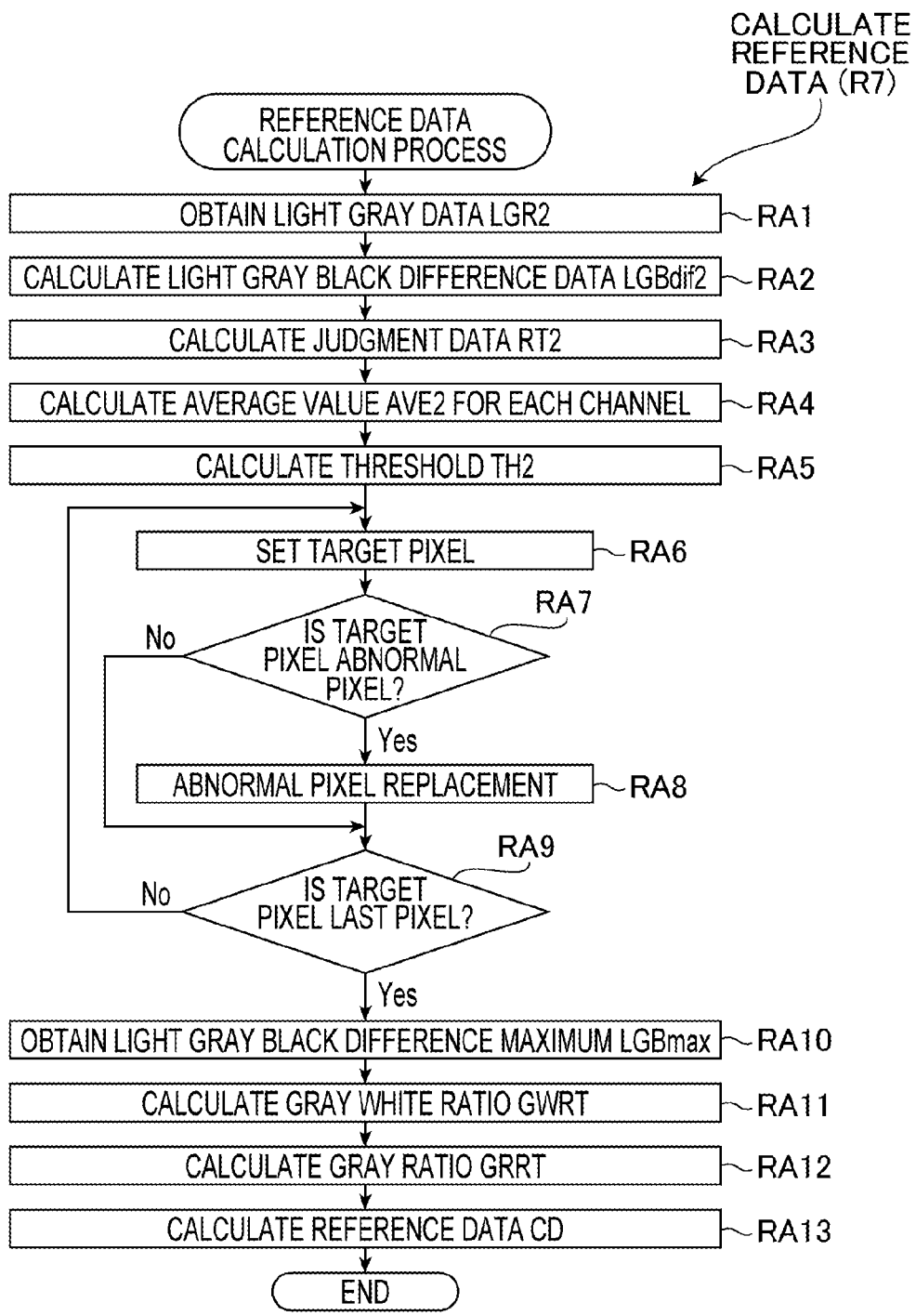
FIG. 8 is a flowchart illustrating a reference data calculation process according to the illustrative embodiment of the disclosures.

The scanning main process shown in FIG. 7 is started when the user places an original sheet GS on the sheet feeding tray 2 and presses a color scanning start button provided on the operation unit 5. Regarding the scanning main process according to the illustrative embodiment, explanation is given about the color mode in the following.

The CPU 40 sets scan-settings to the device control unit 44, the AFE 45 and the image processing unit 46 (R1). Specifically, the CPU 40 obtains settings for the clock signal CLK and the serial-in signal SI corresponding to the resolution of 600 DPI from the flash PROM 43, and sets the settings to the device control unit 44. The CPU 40 obtains settings of signals for the light source 30 in the color mode from the flash PROM 43, and sets the settings to the device control unit 44. The CPU 40 obtains an offset adjustment value and a gain adjustment value for the AFE 45 from the flash PROM 43, and sets the settings to the AFE 45. The CPU 40 sets the image processing unit 46 not to execute the various image processing.

The CPU 40 adjusts the light quantity of the light source 30 (R2). The CPU 40 causes the light source 30 to emit light toward the gray reference plate 34, and adjusts the light quantity ST of each color so that the digital image data obtained when the reflected light is scanned becomes the gray data maximum GRmax.

The CPU 40 obtains the gray data GR2 (R3). Specifically, the CPU 40 illuminates the gray reference plate 34 at the light quantity ST of each color, and obtains, as the gray data GR2, one line of scanned digital image data.

The CPU 40 obtains the black data BK2 (R4). Specifically, the CPU 40 powers off the light source 30, and scans the gray reference plate 34. Then, the CPU 40 obtains, as the black data BK2, the image data of one color of the scanned one line of data.

The CPU 40 obtains the gray black difference maximum GBmax2 (R5). Specifically, the CPU 40 calculates one line of gray black difference data GBdif2 by subtracting the black data BK2 from the gray data GR2 of each color. The CPU 40 obtains, as the gray black difference maximum GBmax2, data located at the pixel positions Pmax, from one line of the gray black difference data GBdif2. The CPU 40 powers on the light source 30 at the maximum light quantity of each color (R6). Specifically, the CPU 40 powers on the light source 30 at the maximum current preliminary defined for each color and the maximum lighting period for scanning resolution of 600 DPI.

The CPU 40 calculates reference data CD (R7). As described in detail later, the CPU 40 illuminates the gray reference plate 34 at the maximum light quantity of each color, and obtains one line of light gray data LGR2. The CPU 40 calculates light gray black difference data LGBdif2 by subtracting black data BK2 from the light gray data LGR2. The CPU 40 replaces values of abnormal pixels, which have abnormal values due to, for example, dust, in the calculated light gray black difference data LGBdif2, with values of peripheral pixels. The CPU 40 calculates the reference data CD by multiplying together the light gray black difference data LGBdif2 which has been subjected to the replacement process, gray white ratio GWRT described later, and gray ratio described later.

The CPU 40 executes a scanning process (R8). Specifically, the CPU 40 sets the image processing unit 46 to execute various types of image processing. The CPU 40 controls the driving circuit 47 to convey the original sheet GS. The CPU 40 operates to scan the conveyed original sheet GS, to execute the shading correction for each color based on the reference data CD, to execute a resolution conversion process after executing various types of correction processes, and to generate the digital image data. After the scanning process is finished (R8), the scanning main process is terminated.

When a reference data calculation process (R7) is started, the CPU 40 obtains the light gray data LGR2 (RA1). Specifically, the CPU 40 illuminates the gray reference plate 34 in a state where the light source 30 is powered on at the maximum light quantity of each color, and obtains, as the light gray data LGR2, the scanned one line of digital image data.

The CPU 40 calculates the light gray black difference data LGBdif2 (RA2). Specifically, the CPU 40 calculates one line of light gray black difference data LGBdif2 by subtracting the black data BK2 from the light gray data LGR2 of each color.

The CPU 40 calculates the judgment data RT2 (RA3). Specifically, the CPU 40 calculates one line of judgment data RT2 by dividing the light gray black difference data LGBdif2 by the light gray black difference data LGBdif1.

The CPU 40 calculates the average AVE2 for each channel (RA4). Specifically, the CPU 40 divides the one line of judgment data RT2 for each color into judgment data RT2 of respective channels. The CPU 40 calculates, as the averages AVE2 for respective channels, average values of the divided judgment data RT2 of each color of the respective channels.

The CPU 40 calculates a threshold value TH2 of each color for each of the channels (RA5). Specifically, the CPU 40 calculates a white threshold value WTH2, by adding a scanning addition value to the average value AVE2 for each channel calculated in step RA4. The CPU 40 calculates a black threshold value BTH2 by subtracting a scanning subtraction value from the average value AVE2 for each channel calculated in step RA4. The threshold value TH2 means the white threshold value WTH2 or the black threshold value BTH2. In this illustrative embodiment, the scanning addition value and the scanning subtraction value are the same value which corresponds to 5% of the average value AVE2 of each channel. Since the scanning addition value and the scanning subtraction value are the same, the effect, given by black dust which would decrease output, to the quality of scanned image and the effect, given by white dust which would increase output, to the quality of scanned image can be controlled to be substantially the same level.

The CPU 40 sets a target pixel (RA6). Specifically, as in the case of step MA6, when a target pixel has been set, the CPU 40 sets a next pixel as the target pixel, and when no target pixel has been set, the CPU 40 sets the top pixel as the target pixel. The CPU 40 obtains the pixel number of the target pixel, and stores the pixel number in the RAM 42. The CPU 40 stores, in the RAM 42, the channel number of a target channel including the target pixel.

The CPU 40 determines whether the target pixel is an abnormal pixel (RA7). Specifically, the CPU 40 determines whether the light gray black difference data LGBdif2 of the target pixel falls within a range which is larger than or equal to the black threshold value BTH2 corresponding to the channel number of the target channel and smaller than or equal to the white threshold value WTH2 corresponding to the channel number of the target channel. When the light gray black difference data LGBdif2 of the target pixel falls within the range (RA7: NO), the CPU 40 determines that the target pixel is not an abnormal pixel and the process proceeds to step RA9 where the CPU 40 determines whether the all the pixels have been processed. When the light gray black difference data LGBdif2 of the target pixel does not fall within the range (RA7: YES), the CPU 40 determines that the target pixel is an abnormal pixel and the process proceeds to step RA8 of the abnormal pixel replacement process. This judgment is executed for each of the channels by using the light gray black difference data LGBdif2 of each color, and the black threshold value BTH2 and the white threshold value WTH2 of the corresponding color.

The CPU 40 replaces the light gray black difference data LGBdif2 of the target pixel with the light gray black difference data LGBdif2 of a peripheral pixel (RA8). Specifically, the CPU 40 replaces the light gray black difference data LGBdif2 of the target pixel with the light gray black difference data LGBdif2 of a pixel included in the channel whose channel number is equal to the channel number of the target channel.

The CPU 40 determines whether the target pixel is the last pixel (RA9). Specifically, the CPU 40 determines whether the pixel number of the target pixel stored in step RA6 is equal to the pixel number indicating the last pixel. When the pixel number of the target pixel is equal to the pixel number indicating the last pixel (RA9: YES), the CPU 40 deletes the pixel number and the channel number stored in step RA6, and the process proceeds to a light gray black difference maximum LGBmax obtaining process (RA10). When the pixel number of the target pixel is not equal to the pixel number indicating the last pixel (RA9: NO), the process returns to the target pixel setting process RA6.

The CPU 40 obtains the light gray black difference maximum LGBmax (RA10). Specifically, the CPU 40 obtains, as the light gray black difference maximum LGBmax, data located at the pixel position Pmax of the light gray black difference data LGBdif2 which has been subjected to the replacement process.

The CPU 40 calculates the gray white ratio GWRT (RA11). Specifically, the CPU 40 divides the gray black difference maximum LGBmax by the white and black difference maximum WBmax at each pixel position Pmax, and calculates, as the gray white ratio GWRT, the average of the values of 16 pixels obtained by the division. This step is executed for each color.

The CPU 40 calculates the gray ratio GRRT (RA12). Specifically, the CPU 40 divides the gray black difference maximum GBmax2 by the gray black difference maximum GBmax1, and obtains, as the gray ratio GRRT, the average of values of the 16 pixels obtained by the division. This step is executed for each color.

The CPU 40 calculates the reference data CD (RA13). Specifically, the CPU 40 calculates the reference data CD by multiplying together the light gray black difference data LGBdif2 which has been subjected to the replacement process, the gray white ratio GWRT and the gray ratio GRRT.

In the white and black difference maximum WBmax obtaining process M7 of the maintenance main process, 16 pixels of white and black difference data WBdif selected in descending order from the white and black difference data WBdif of red color is provided as the white and black difference maximum WBmax. Furthermore, in the white and black difference maximum WBmax obtaining process M7, the white and black difference maximum WBmax of each of blue color and green color are calculated at positions of the 16 pixels (pixels of the pixel position Pmax) at which the white and black difference maximum WBmax of red color exist. Therefore, the white and black difference maximum WBmax of the respective colors are obtained at the same pixel positions Pmax, and fluctuation of the white and black difference maximum WBmax between the respective colors can be reduced. In the light gray black difference maximum LGBmax obtaining process RA10 of the reference data calculation R7 in the scanning main process, the light gray black difference data LGBdif2 at the pixel positions Pmax are obtained as the light gray black difference maximum LGBmax. In this case, the light gray black difference maximum LGBmax is obtained at the same pixel position Pmax as that of the white and black difference maximum WBmax, and therefore the fluctuation of the light gray black difference maximum LGBmax can be reduced. In the gray white ratio GWRT calculation RA11 of the reference data calculation R7 in the scanning main process, the gray white ratio GWRT is calculated by dividing the white and black difference maximum WBmax by the light gray black difference maximum LGBmax. In the reference data CD calculation of the reference data calculation R7 in the scanning main process, one line of reference data CD of each color is calculated by multiplying the light gray black difference data LGBdif2 by the gray white ratio GWRT. Thus, the gray white ratio GWRT is calculated from the white and black difference maximum WBmax and the light gray black difference maximum LGBmax whose fluctuation has been reduced. Therefore, it is possible to calculate the gray white ratio GWRT with a high degree of accuracy. Since the reference data CD is calculated from the accurate gray white ratio GWRT, the reference data CD can be calculated with a high degree of accuracy.

Variations

It is understood that the present disclosure is not limited to the above described illustrative embodiment explained with reference to the accompanying drawings, and can be varied in various ways without departing from the technical concept of the present disclosure as described below.

(1) The image scanning apparatus 1 according to the illustrative embodiment may be applied to a multifunction peripheral having a printing unit. In the above described illustrative embodiment, one scanning unit 24 and one gray reference plate 34 are provided in the image scanning apparatus 1; however, two scanning units and two gray reference plates for reading both sides of an original sheet may be provided in an image scanning apparatus.

(2) In the above described illustrative embodiment, all of the maintenance main process shown in FIG. 5 and the scanning main process shown in FIG. 7 are executed by the CPU 40; however, the present disclosure is not limited to such a configuration. For example, a part of steps M3 to M8 and M11 to M15 of the maintenance main process and a part of steps R2 to R7 of the scanning main process may be executed by the image processing unit 36, the device control process 44 or the AFE 45. The maintenance main process may be executed by an external apparatus, e.g., an external computer, independently provided from the image scanning apparatus 1.

(3) In the above described illustrative embodiment, the explanation about the maintenance main process shown in FIG. 5 and the scanning main process shown in FIG. 7 is given in regard to the color mode; however, the monochrome mode may be executed in these processes. In the color mode, one line is constituted by thee colors. On the other hand, in the monochrome mode, one line is constituted by one color.

(4) In the above described illustrative embodiment, the pixel positions Pmax are pixel positions of 16 pixels. However, when the fluctuation of the digital image data is large, the pixel numbers larger than 16 pixels may be used. On the other hand, when the fluctuation of the digital image data is low, the pixel number smaller than 16 pixels may be used. The pixel number of 16 pixels used in the illustrative embodiment is determined as an impermissible abnormal pixel number with respect to the pixel number of 4960 which is defined when an original sheet of A4 size having a width of 210 mm is scanned at 600 DPI.

(5) In the above described illustrative embodiment, explanation about the light gray black difference data storing process (M15) is given in regard to only the light gray data LGR1 of red color; however, two colors or three colors of light gray black difference data may be stored by using two colors or three colors of light gray data.

What is claimed is:

1. An image scanning apparatus, comprising:
a gray reference member disposed in a conveying path in which an original sheet is to be conveyed, a reflection coefficient of the gray reference member being lower than that of a white reference member;
a scanning unit configured to scan an image on the original sheet on a line basis, the scanning unit including a light source configured to illuminate the original sheet when the original sheet passes the gray reference member and a photoelectric conversion element aligned in a scanning direction which is a transverse direction of the conveying path;
a light quantity setting unit configured to set a light quantity adjustment value for the light source within a range up to a particular maximum light quantity value;
a signal conversion unit configured to convert an analog signal outputted from the photoelectric conversion element to digital data;
a correction unit configured to execute shading correction for the digital data based on reference data;
a storage unit; and
a controller configured to execute a preparatory operation and thereafter execute a scan-preprocessing operation, wherein, as the preparatory operation, the controller is configured to:
obtain first black data of one line output from the signal conversion unit in a state where the light source is turned off;
obtain white data of one line output from the signal conversion unit when the light source illuminates the white reference member in a state where the light quantity adjustment value is a particular light quantity adjustment value;
calculate white and black difference data of one line by subtracting the first black data of one line from the white data of one line at same pixel positions;
calculate a white and black difference maximum value which is a maximum value from all pixels of the one line of the white and black difference data and obtain a particular pixel position corresponding to the white and black difference maximum value; and
store the white and black difference maximum value and the particular pixel position in the storage unit while associating the white and black difference maximum value with the particular pixel position, wherein, as the scan-preprocessing operation, the controller is configured to:

obtain second black data of one line output from the signal conversion unit in a state where the light source is turned off;

obtain light gray data of one line output from the signal conversion unit when the light source illuminates the gray reference member at the particular maximum light quantity value;

calculate light gray black difference data of one line by subtracting the second black data of one line from the light gray data of one line;

calculate a gray white ratio by dividing the white and black difference maximum value at the particular pixel position by the light gray black difference data at the particular pixel position; and calculate the reference data of one line by multiplying the light gray data of one line by the gray white ratio.

2. The image scanning apparatus according to claim 1, wherein:

the white data is formed of a plurality of pieces of color data; and the controller is configured to:

calculate the white and black difference maximum value using the white and black difference of particular color data which is one of the plurality of pieces of color data; and obtain, as the particular pixel position, a pixel position of the white and black difference maximum value for each of the plurality of pieces of color data.

3. The image scanning apparatus according to claim 1, wherein the controller is configured to:

obtains, as the white and black difference maximum value, values of a particular number of pixels selected in descending order from the white and black difference data;

store the white and black difference maximum value and the particular pixel position for each of the particular number of pixels while associating the white and black difference maximum value with the particular pixel position for each of the particular number of pixels;

calculate, as the gray white ratio, an average of values obtained by dividing, for each of the particular number of pixels, the white and black difference maximum value at the particular pixel position by the light gray black difference data at the particular pixel position.

4. The image scanning apparatus according to claim 2, wherein the white and black difference maximum value of the particular color data is greatest of all of white and black difference maximum values of the plurality of pieces of color data.

5. The image scanning apparatus according to claim 2, wherein:

the plurality of pieces of color data include red color data, blue color data and green color data; and the particular color data is the red color data.

6. An image scanning apparatus, comprising:

a gray reference member disposed in a conveying path in which an original sheet is to be conveyed, a reflection coefficient of the gray reference member lower than that of a white reference member;

a scanning unit configured to scan an image on the original sheet on a line basis, the scanning unit including a light source configured to illuminate the original sheet when the original sheet passes the gray reference member and a photoelectric conversion element aligned in a scanning direction which is a transverse direction of the conveying path;

a light quantity setting unit configured to set a light quantity adjustment value for the light source within a range up to a particular maximum light quantity value;

a signal conversion unit configured to convert an analog signal outputted from the photoelectric conversion element to digital data;

a correction unit configured to execute shading correction for the digital data based on reference data;

a storage unit; and a controller configured to execute a preparatory operation and thereafter execute a scan-preprocessing operation, wherein, as the preparatory operation, the controller is configured to:

obtain first black data of one line output from the signal conversion unit in a state where the light source is turned off;

obtain white data of one line output from the signal conversion unit when the light source illuminates the white reference member in a state where the light quantity adjustment value is a particular light quantity adjustment value;

obtain first gray data of one line output from the signal conversion unit when the light source illuminates the gray reference plate in a state where the light quantity adjustment value is the particular light quantity adjustment value;

calculate white and black difference data of one line by subtracting the first black data of one line from the white data of one line at same pixel positions;

calculate a white and black difference maximum value which is a maximum value from all pixels of the one line of the white and black difference data and obtain a particular pixel position corresponding to the white and black difference maximum value; and calculate first gray black difference data of one line by subtracting the first black data of one line from the first gray data of one line and calculate a gray black difference maximum value which is the first gray black difference data at the particular pixel position;

store the white and black difference maximum value, the gray black difference maximum value and the particular pixel position in the storage unit while associating the white and black difference maximum value, the gray black difference maximum value and the particular pixel position with each other, wherein, as the scan-preprocessing operation, the controller is configured to:

obtain second black data of one line output from the signal conversion unit in a state where the light source is turned off;

obtain light gray data of one line output from the signal conversion unit when the light source illuminates the gray reference member at the particular maximum light quantity value;

obtain second gray data of one line output from the signal conversion unit when the light source illuminates the gray reference plate in a state where the light quantity adjustment value is the particular light quantity adjustment value;

calculate light gray black difference data of one line by subtracting the second black data of one line from the light gray data of one line;

calculate second gray black difference data of one line by subtracting the second black data of one line from the second gray data of one line;

calculate a gray white ratio by dividing the white and black difference maximum value at the particular pixel position by the light gray black difference data at the particular pixel position;

calculate a gray ratio by dividing the second gray black difference data at the particular pixel position by the gray black difference maximum value; and calculate the reference data of one line by multiplying together the light gray data of one line, the gray white ratio and the gray ratio.

\* \* \* \* \*